United States Patent

[11] 3,593,380

| [72] | Inventors | Sergei Georgievich Voronov<br>Vyborgskaya naberezhnaya, 13, kv. 13,<br>Leningrad;<br>Vladimir Dmitrievich Yashin,<br>Leningradskoi oblasti, ulitsa, Narvskaya<br>14, Luga, both of, U.S.S.R. |
|---|---|---|
| [21] | Appl. No. | 783,225 |
| [22] | Filed | Dec. 12, 1968 |
| [45] | Patented | July 20, 1971 |

[54] MOLDING PLATE OF A PRESS MOLD FOR MAKING ARTICLES OF BLANKS OF LOOSE MATERIALS
4 Claims, 3 Drawing Figs.

[52] U.S. Cl. .................................................. 18/34 R, 30/DIG. 44
[51] Int. Cl. ..................................................B26b 19/38
[50] Field of Search .......................................... 18/5 H, 34 R, DIG. 14, DIG. 44

[56] References Cited
UNITED STATES PATENTS

| 2,519,661 | 8/1950 | Johnson ...................... | 18/19 |
| 2,449,407 | 9/1948 | Mulholland .................. | 18/5 |
| 1,260,002 | 3/1918 | Lanhoffer...................... | 18/19 |
| 2,172,243 | 9/1939 | Goodnow...................... | 264/313 |
| 2,101,015 | 12/1937 | Anderson...................... | 18/34 |

Primary Examiner—Charles W. Lanham
Assistant Examiner—R. M. Rogers
Attorney—Waters, Roditi, Schwartz & Nissen ABSTRACT: A mold plate for a press mold utilized to form articles, such as grinding wheels or the like, from loose material, including a mold plate having a recess portion adapted to receive a resilient fluid-filled receptacle. The fluid-filled receptacle facilitates the application of uniform pressure across the material it contacts during the compression of the latter.

MOLDING PLATE OF A PRESS MOLD FOR MAKING ARTICLES OF BLANKS OF LOOSE MATERIALS

The present invention relates to manufacture of abrasive tools and, more specifically, it relates to molding plates of press molds designed for making articles or blanks, preferably, abrasive tools, for example, grinding wheels, blanks for whetstones, etc. of loose molding masses.

Molding plates of press molds are well known in the prior art, which plates are mounted in a die of a press mold and used for making articles and blanks of loose molding mass with the aid of a punch acting upon the molding plate. These plates, however, suffer from a number of disadvantages which consist in the following.

When employing the existing metal press molds, it is difficult to produce uniform density; therefore, hardness, all over the entire surface of the pressed abrasive articles and blanks, as well as density and hardness of the articles depend on the uniformity of placing the molding mass into the press mold, yet all the existing devices do not provide for the necessary uniformity of placing the molding mass.

The nonuniform density and hardness all over the whole surface of the pressed abrasive articles or blanks are conducive to their misalignment and a nonuniform wear in service.

Moreover, during the action of the punch upon the molding film of the press mold the skewing of the press crosspieces is possible; therefore, transmission of the efforts to the molding plate may be uneven all over its entire surface, and this will result in an additional nonuniformity in the density and hardness of the articles and blanks being made.

Attempts have been made to use hollow elastic plates filled with liquid in press molds for making articles or blanks of loose molding masses. Such an elastic plate was placed into the press mold between the surface of the molding mass and the working surface of the molding plate for producing equal pressure over the whole surface of the article or blank being made.

However, in this case, when pressing the article or blank, the elastic plate is unevenly deformed due to its friction about the walls of the press mold die as well as due to friction of the molding mass against the same walls, the greatest deformation of the aforementioned plate and the slightest packing of the pressed mass being developed at the said walls.

Moreover, the tight fitting of the elastic plate to the walls of the press mold leads to a high wear of the plate and prevents free escape of air from the molding mass being pressed, and this, in turn, causes exfoliation of the finished articles or blanks.

The object of the present invention is to provide a mechanically simple molding plate of a press mold for making articles or blanks of loose molding masses, preferably, abrasive tools, which would make it possible to manufacture equalized articles having uniform density and hardness.

According to this and other objects, the invention consists in that in the molding plate of the press mold for making articles or blanks, preferably abrasive tool, of loose molding mass, when employing a hollow elastic plate filled with liquid and provided on the working side of the molding plate, the hollow elastic plate filled with liquid is built into a recess provided in the molding plate.

The hollow elastic plate filled with liquid is preferably built into the recess of the molding plate flush with the working surface of its projecting portions.

Other objects and advantages of the invention will become more fully apparent from a consideration of the following description of exemplary embodiments thereof, taken in conjunction with the accompanying drawings, in which.

Figure 1:
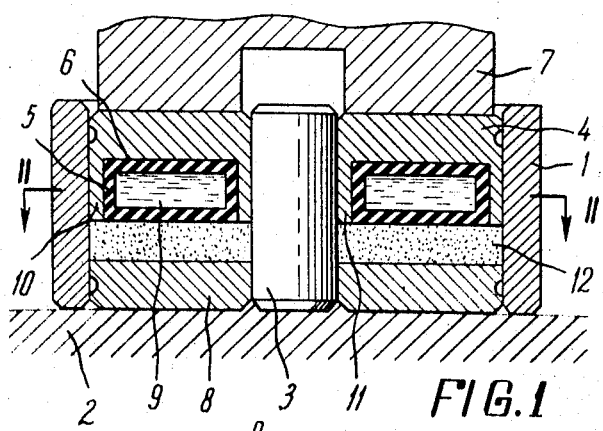
FIG. 1 is an elevational view of the press mold complete with a molding plate according to the invention.

When describing the embodiments of the invention, concise terminology is used for the sake of clarity. It should be understood, however, that the invention is not limited by the narrow terms adopted herein and that each such term comprises all the identical elements functioning in a similar way and used for solving the same problems.

The molding plate according to the invention is described conforming to the embodiment in which it is used in a press mold for making abrasive tools, for example, grinding wheels.

The press mold comprises an external hollow die (FIGS. 1 and 2) mounted on a lower crosspiece 2 of the press (not shown on the drawings); an internal die 3 provided in the middle portion of the die 1, an upper molding plate 4 complete with a hollow elastic plate 5 filled with a liquid, plate which, according to the invention, is built into a recess 6 made in the molding plate 4 on its working side; a punch 7 connected to the molding plate 4 and used for actuating the plate during the pressing of the molding mass; a lower molding plate 8 provided in the die 1.

The external hollow die 1 is made cylindrical, but it may be of any other shape, for example, square.

The internal die 3 is also cylindrical but it may be eliminated when making flat articles or blanks.

The upper molding plate has an annular shape and is put on the internal die 3 through its opening in the middle portion.

The elastic plate 5 has an annular shape and located in the ring shape recess of the molding plate 4 provided on its working side. The plate 5 may be of another shape, for example, square, in which case the molding plate 4 should be provided on its working side with a recess of the same shape.

The walls of the hollow elastic plate 5 are made of rubber. The hollow of the elastic plate 5 is filled with a fluid, for example, water; thereafter the hollow is sealed.

The annular recess 6 in the molding plate 4 is embodied so that there are provided projecting portions: an external portion 10 and an internal portion 11, the hollow liquid-filled elastic plate 5 being built into the recess 6 flush with the working surface of the above external and internal portions.

For the bilateral pressing of articles or blanks, the lower molding plate 8 is made movable, while during the unilateral pressing the plate 8 is made stationary with the aid of the upper molding plate.

Figure 2:
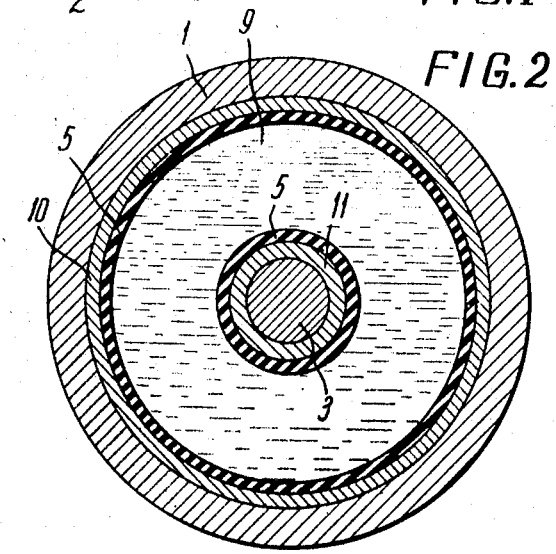
FIG. 2 is the same shown as a top sectional view taken on line II-II of FIG. 1.

The pressed loose molding mass (article) 12 is positioned between the upper molding plate 4 and the lower molding plate 8 (FIG. 1).

In some cases, the hollow liquid-filled elastic plate 5 may be built into the lower molding plate 8.

The manufacturing of articles or blanks of loose molding materials preferably abrasive tools, with the aid of the molding plate, according to the invention, is effected as follows.

The loose molding mass 12 based on ceramic, organic or other binders is charged between the annular die 1 and the die 3 onto the lower molding plate 8 in an even layer by employing the known methods; thereafter, the upper molding plate 4 is installed on the loose molding mass 12.

Figure 3:
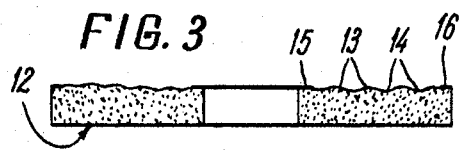
FIG. 3 is an elevational view of the article made in the press mold equipped with the molding plate according to the invention.

When the punch 7 of the press (not shown in the drawings) acts upon the upper molding plate 4, the latter together with the lower plate 8 presses the loose molding mass 12 for making an article or a blank of predetermined dimensions (the article is shown in FIG. 3).

The hollow elastic plate 5 filled with liquid acts upon the loose molding mass 12 with a uniform pressure over the whole surface of this mass.

In this case, the manufactured article or blank has an uneven surface on the side of the upper molding plate 4 due to the nonuniform placing of the loose molding mass 12 into the die 1 and possible skews of the crosspiece 2 and punch 7.

In those places where larger quantities of loose molding mass are available projections 13 are formed (FIG. 3), whereas in the places supplied with smaller quantities of molding mass, corresponding cavities or recesses 14 are formed however, the pressed article or blank has a uniform density and, hence, hardness.

Roughness of the surface of the manufactured article or blank is removed by their machining.

Portions 15 and 16 of the surface of the articles or blanks located under the ring shape projecting portions 10 and 11 of the molding plate 4 are made smooth during the pressing operation. These surfaces are used for checking the height of the article or blank being pressed; therefore, the volumetric weight and structure of the manufactured article are also checked.

The manufacturing of articles or blanks, preferably of abrasive tools from loose molding materials with the aid of the molding plate of the press mold, according to the invention, presents the following advantages.

Mounting of the hollow liquid-filled elastic plate 5 in the recess 6 of the molding plate 4, according to the invention, makes it possible to press articles or blanks in ordinary press molds by employing the known methods of filling these press molds with molding mass.

The pressing of articles or blanks with the aid of the molding plate 4 having the elastic plate 5 built in into the recess of the former, makes it possible to ensure uniform pressure all over the surface of the article or blank being pressed, which provides for manufacturing articles or blanks of uniform density, hardness and structure, as well as with a high grade of their balancing, and this, in turn, ensures uniform wear of the articles during their service.

The elastic plate 5 built in the recess 6 of the molding plate 4 of the press mold compensates for possible skews of the crosspieces of the press, thus providing for the successful manufacturing of articles or blanks of uniform density, hardness and structure.

The mounting of the elastic plate 5 in the recess 6 of the press mold permits friction of the walls of the plate 5 against the walls of the die 3 to be eliminated so that the elastic plate is uniformly deformed during the operation, and this prevents its rapid wear.

Use of the molding plate 4, according to the invention, also helps to increase quality of the articles without increasing the cost of production.

Although the present invention is described in connection with its preferable embodiment, it will be evident that variants and modifications may be allowed without departing from the scope and idea of the invention, which will be obvious to those skilled in the art. These variants and modifications are considered to fall within the scope and idea of the invention, as defined by the following claims.

What we claim is:

1. In a press mold for forming articles or blanks from loose material, a mold plate construction, comprising, mold plate means, a recess formed in said mold plate means, and a closed resiliently deformable hollow fluid-filled receptacle being positioned within said recess and adapted to exert pressure against said loose material upon compression of the latter.

2. A press mold as claimed in claim 1, wherein said recess is encompassed by projecting portions of said mold plate means defining the working surface thereof, said fluid-filled receptacle being positioned within said recess so as to provide a material-contacting surface essentially coplanar and coextensive with the working surface of said mold plate means.

3. A press mold as claimed in claim 1, wherein said recess comprises an annular groove in said mold plate means, and said fluid-filled receptacle comprises an annular ring member conforming in cross-sectional configuration generally to the contour of said annular groove.

4. A press mold as claimed in claim 1, wherein said loose material comprises abrasive powder for forming grinding wheels or the like.